United States Patent [19]

Pesar et al.

[11] Patent Number: 5,243,380

[45] Date of Patent: Sep. 7, 1993

[54] BOARD FAULT ISOLATION TECHNIQUE

[75] Inventors: Robert J. Pesar, Rochester; Christopher J. Auclair, Penfield, both of N.Y.

[73] Assignee: Xerox Corporation, Stamford, Conn.

[21] Appl. No.: 914,398

[22] Filed: Jul. 17, 1992

[51] Int. Cl.$^5$ .............................................. G03G 15/00
[52] U.S. Cl. .................... 355/204; 355/206; 355/207; 355/209; 345/200; 371/16.1; 371/20.1
[58] Field of Search ............................ 355/203-209; 371/16, 16.1, 20, 19; 364/200, 900, 184

[56] References Cited

U.S. PATENT DOCUMENTS

| | | | |
|---|---|---|---|
| 4,035,072 | 7/1977 | Deetz et al. | |
| 4,156,133 | 5/1979 | Legg | 235/92 |
| 4,514,846 | 4/1985 | Federico et al. | 371/16 |
| 4,521,847 | 6/1985 | Ziehm et al. | 364/184 |
| 4,550,382 | 10/1985 | Federico et al. | 364/572 |
| 4,698,772 | 10/1987 | Carter et al. | 364/900 |
| 4,870,644 | 9/1989 | Sherry et al. | 371/16.1 |

Primary Examiner—A. T. Grimley
Assistant Examiner—T. Dang
Attorney, Agent, or Firm—Ronald F. Chapuran

[57] ABSTRACT

A technique for providing screen dialog related to communication between predetermined control boards of an image processing machine and in particular to the method of analyzing the communication between the control boards by providing a visual indication of the control boards on an interface display, initiating transmission between the control boards at the interface display, displaying data in a window on the interface display to validate communication between selected boards, and scrolling the data within the window to display data among other boards, the data including board identification and validation information.

14 Claims, 5 Drawing Sheets

BOARD FAULT ISOLATION TECHNIQUE

BACKGROUND OF THE INVENTION

The invention relates to a circuit board fault isolation technique and more particularly, to the use of the user interface display screen to display communications between selected boards.

It is important to the maintenance of complex electronic equipment such as reproduction machines to reduce the service cells and time spent in monitoring and maintaining the machine operation, in particular, reducing the cost of maintenance and service. Often diagnostic procedures and trouble shooting codes for a particular machine are totally unique to that machine, and the Service Representative must learn each machine's diagnostic procedures and codes separately. It would be desirable, therefore, to provide standardized diagnostic procedures and codes for use in many machines which the Service Representative can use to correct malfunctions and maintain operation without the need for extensive retraining.

Reproduction machines comprise several interrelated subsystems control boards such as the paper path station, the exposure/scan station, the xerographic station. Checking the operation of the machine, it is often necessary for the Service Representative to isolate on one of the stations to the exclusion of the others. In doing so, the Service Representative is aided by status and maintenance codes displayed on a machine control panel to assist him or her in proper diagnosis and correction of machine malfunction. The Service Representative often used extensive fault trees, charts and trouble shooting procedures to interpret the various codes into corrective procedures. It would be desirable, therefore, to eliminate the need for resort to extensive trouble shooting procedures during machine diagnostics, and it would be desirable to provide a diagnostic system in which communications between boards are visually related and are displayed in a predetermined manner.

On many occasions, a service representative using the machine display screen to assist in machine diagnosis can be frustrated in trouble shooting if the screen itself is malfunctioning. In addition, even if the screen display is operable, a service representative often spends excessive time in pinpointing the source of faulty transmissions between control boards. It would be desirable, therefore, to provide an easy and quick method of isolating faults to a particular control board.

Prior art diagnostic procedures on providing fault information in machines are well known. For example, U.S. Pat. Nos. 4,035,072 and 4,156,133 teach various diagnostic techniques. None of the prior art systems, however, heed the difficulty of adapting to a malfunction of the screen itself as well as a rapid mechanism for isolating faults.

It is an object of the present invention, therefore, to provide a new and improved technique to simply and quickly isolate faults between control boards. It is still another object of the present invention to be able to isolate a malfunction to the board controlling the screen display. It is still another object of the present invention to be able to visually validate communication between selected control boards. Other advantages of the present invention will become apparent as the following description proceeds, and the features characterizing the invention will be pointed out with particularity in the claims annexed to and forming a part of this specification.

SUMMARY OF THE INVENTION

Briefly, the present invention is concerned with a technique for providing screen dialog related to communication between predetermined control boards of an image processing machine and in particular to the method of analyzing the communication between the control boards by providing a visual indication of the control boards on an interface display, initiating transmission between the control boards at the interface display, displaying data in a window on the interface display to validate communication between selected boards, and scrolling the data within the window to display data among other boards, the data including board identification and validation information.

For a better understanding of the present invention, reference may be had to the accompanying drawings wherein the same reference numerals have been applied to like parts and wherein:

DETAILED DESCRIPTION OF THE DRAWINGS

Figure 1:
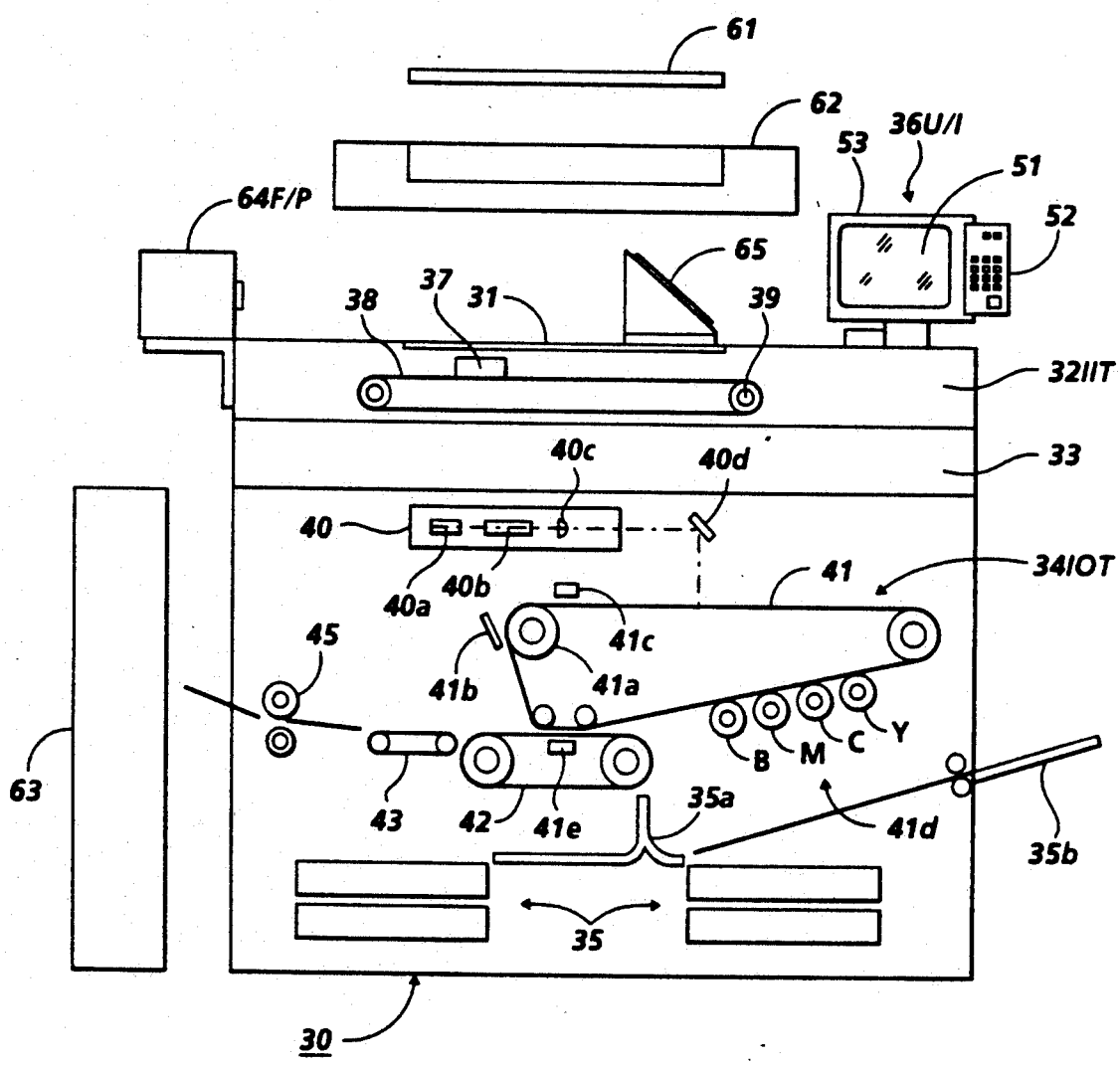
FIG. 1 is a schematic elevational view depicting various operating components and subsystems of a typical machine incorporating the present invention.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention.

DETAILED DESCRIPTION OF THE PREFERRED EMBODIMENT

For a general understanding of the features of the present invention, reference is made to the drawings. In the drawings, like reference numerals have been used throughout to identify identical elements.

FIG. 1 shows one example of the overall construction of a color copying machine to which this invention is applied. The color copying machine to which this invention is applied is formed with the base machine 30, i.e. the basic constituent unit, which is composed of a platen glass plate 31, which carries the original sheet thereon, an image input terminal (IIT) 32, an electrical control system container 33, the image output terminal (IOT) 34, and a paper tray 35, and a user interface (U/I) 36 and also, as optional items, of an editing pad 61, an automatic document feeder (ADF) 62, a sorter 63, and a film projector (F/P) 64.

Electrical hardware is necessary for performing the control of the IIT, IOT, U/I, etc. mentioned above, and a plural number of boards for each of the processing units, such as the IIT, IPS, U/I, F/P, and so forth, which perform the image-forming process for the output signals from the IIT, and these are accommodated further in the electrical control system container 33, together with the SYS board for performing the control of these, and the MCB board (the Machine Control Board) for controlling the IOT, the ADF, the sorter, and so forth.

The IIT 32 is composed of an imaging unit 37, the wire 38 for driving the said unit, the driving pulley 39, and so forth, and IIT 32 reads a color original sheet for each of the primary colors B (Blue), G (Green), and R (Red) by means of a CCD line sensor and a color filter provided inside the imaging unit 37, converts the data so obtained into digital image signals and then outputs the signals to the IPS.

In the IPS, the B, G, and R signals mentioned above are transformed into the primary colors of the toner, i.e. Y(Yellow), C(Cyan), M(Magenta), and K(Black), and then, with various data processing being applied to the data so obtained for the purpose of enhancing the reproduction fidelity and fineness, and so forth, the IPS converts the toner signals of the process color in harmonious gradation into binary toner signals and outputs them to the IOT 34.

The IOT 34, which is provided with a scanner 40 and a photosensitive material belt 41, converts the image signals from the above-mentioned IPS into optical signals in the laster output part 40a and forms a latent image corresponding to the image on the original sheet on the photosensitive material belt 41 by way of the polygon mirror 40b, the lens 40c, and the reflexive mirror 40d. The photosensitive material belt 41, which is driven by the driving pulley 41a, has a cleaner 41b, a charging unit 41c, the individual developing devices for Y, M, C, and K, and a transfer device 41e arranged around it. And, opposite to this transfer device 41e is provided a transfer unit 42, which takes into it the sheet that comes transported to it from the paper tray 35 via the paper transport channel 35a and transfers the colors in the order of Y, M, C, and K, the transfer unit 42 being rotated four turns, for example, for full-color copying in four full colors. The sheet of paper on which the image is so transferred is then transported from the transfer unit 42 via the vacuum transport device 43 to the fixing device 45, where it is fixed, and is thereafter discharged from it. Moreover, the paper transport channel 35a is so designed as to accept the paper fed alternatively from the SSI (Single Sheet Inserter) 35b.

The U/I 136 is designed for use by the user for making the selections of the desired functions and for giving instructions regarding the conditions for the execution of the selected functions, and this system is provided with a color display unit 51 and a hardware control panel 52 installed by the side of the said display unit, and it is further combined with an infrared ray touch board 53, so that instructions can be given directly with the "soft buttons" on the screen. For further details reference is made to U.S. Pat. No. 5,032,903 incorporated herein.

Figure 2:
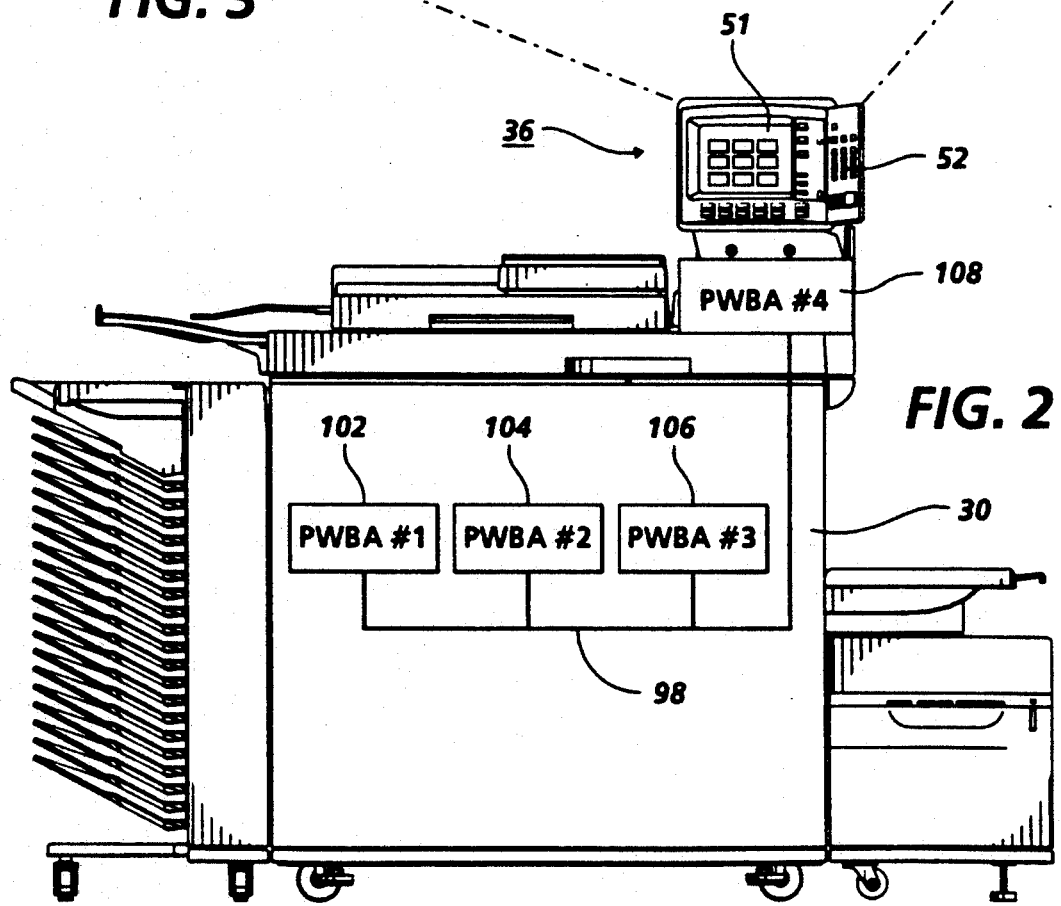

With reference to FIG. 2, there is illustrated in general block form, the control of the base machine 30 shown in FIG. 1. The base machine is controlled by a plurality of printed wiring boards interconnected to a common channel or bus 98. For purposes of explanation, four printed wiring boards, boards 102, 104, 106 and 108 are illustrated, with printed wiring board 108 being the control for the user interface 36 and the remaining printed wiring boards providing control for predetermined systems and components of the base machine 30. It should be understood that the number of printed wiring boards and the manner of interconnection is merely a design choice and any other suitable control scheme for controlling the base machine is contemplated within the scope of this invention. It should also be noted that one of the printed wiring boards, for example, board 102 could be the master control for the other printed wiring boards or that there could be any number of master slave relationships of the control boards or distributed control of the various functions of the base machine.

Figure 3:
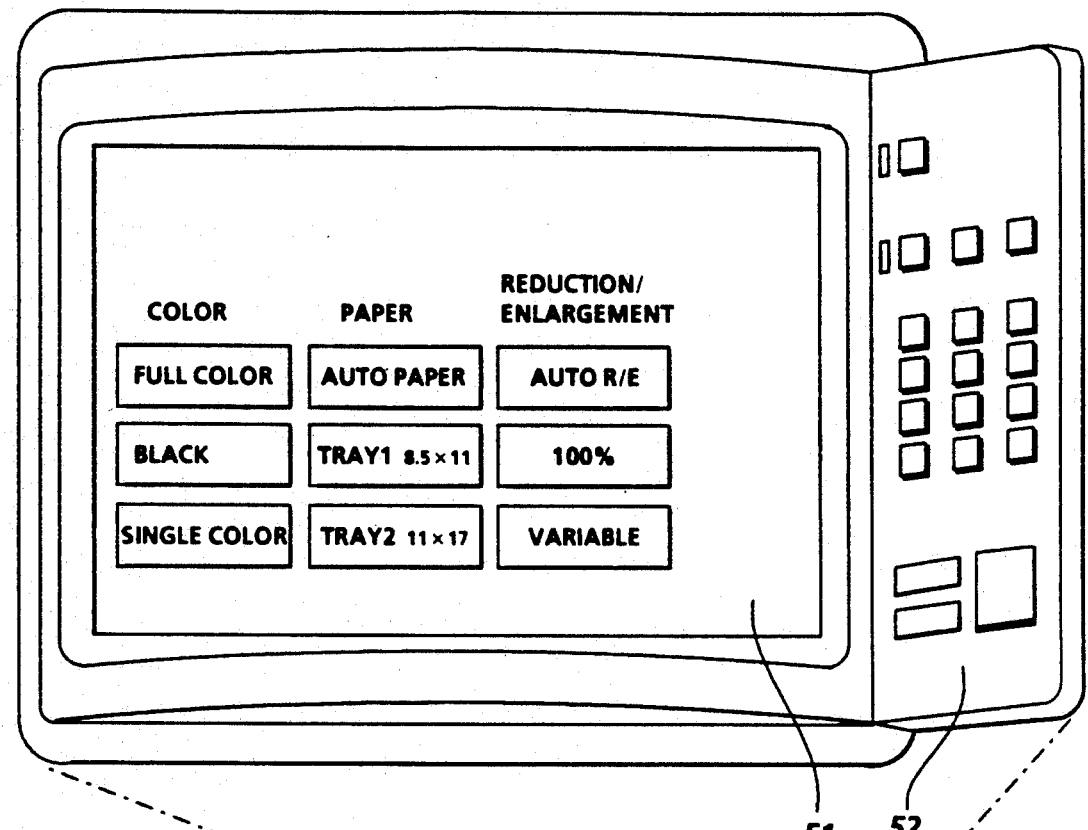
FIGS. 2-6 are front views of the touch monitor screen depicting communication displays in accordance with the present invention.

For purposes of understanding the present invention, it is only necessary to know that the base machine 30 has control software resident on several printed circuit boards that communicate with each other using a common network, and that the base machine 30 has a user interface 36 that is controlled by software that is also part of the common network, illustrated by printed circuit board 108. FIG. 3 is merely a simplified version of the color display unit 51, and hardware control panel 52 of the user interface 36 illustrating various soft control buttons such as full color, auto paper, and auto reduction/enlargement.

In accordance with the present invention, the printed circuit board 108 controlling the user interface 36, is able to monitor all communications on the network 98 and display the communications on the screen 51. In the event of a machine malfunction, the service representative, in a preferred embodiment of the invention, enters a hard key sequence that is recognized by the printed circuit board 108. This recognition of the key sequence by the printed circuit board 108 enables the control 108 to monitor the communications network 98 and display the communications appearing on the screen 51. In short, the service representative merely enables a predetermined key sequence at the hardware control panel 52 to initiate a communications network monitor mode to monitor communications between selected elements such as the printed wiring boards 102, 104, 106 and 108 on the network 98.

Figure 4:
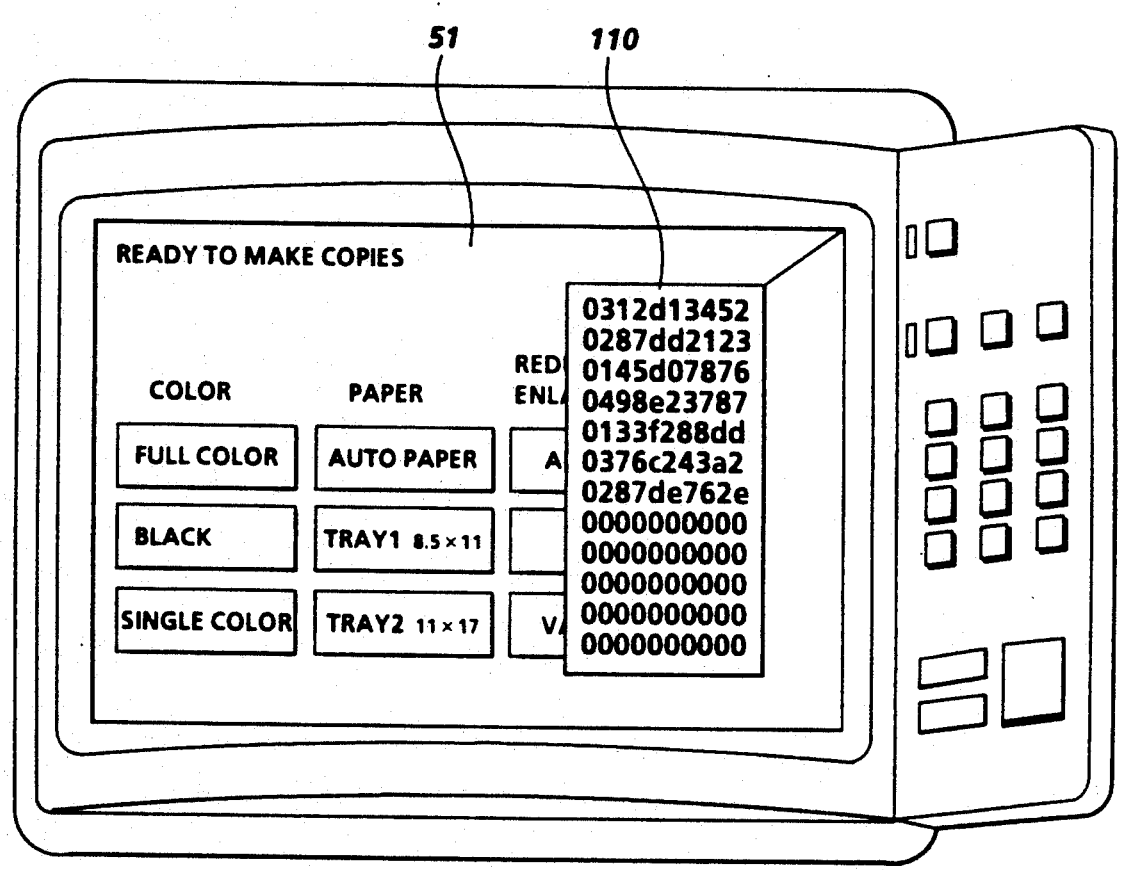

As illustrated at 110 in FIG. 4, upon entering the communications network monitoring mode, a network communication trace automatically appears on the screen 51. Each sequence of alpha numeric information represents communication information. It is merely a design choice whether or not the alpha numeric information is coded or non-coded and the general manner of conveying communication information. As an example, in one specific embodiment, the first digits could identify the printed circuit board sending the information and the remaining alpha numeric characters identifying the information or command that is being sent and the destination or printed wiring board that is to receive the command.

In this way, the service representative can visually monitor the printed wiring board that is sending a command, the command that is being sent and also determine if the command is received and a proper message, if appropriate, sent in return. Thus, the network trace 110 on screen 51 provides a real time flow of the communications between the printed circuit boards on the common network. It should be noted that the network communications trace can result from the normal flow of information between printed circuit boards without any further external involvement such as from the service representative. On the other hand, the communications can be the direct result of activity initiated by the service representative at the machine console.

Figure 5:
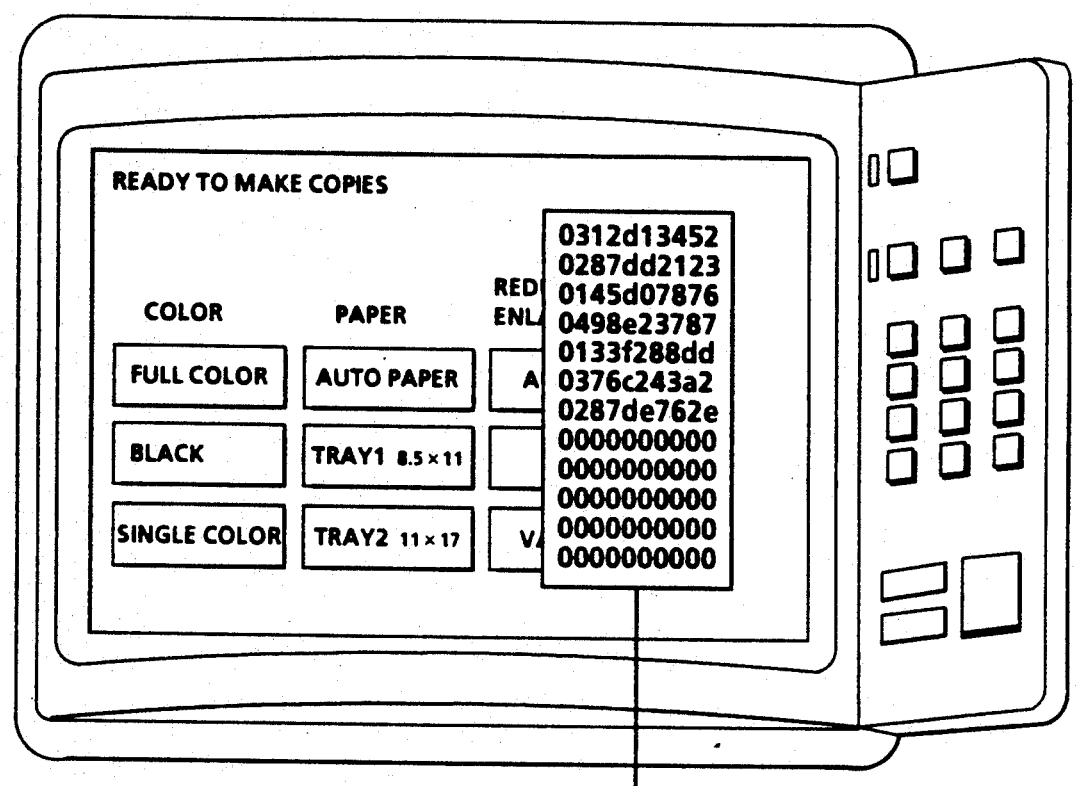
Figure 5:
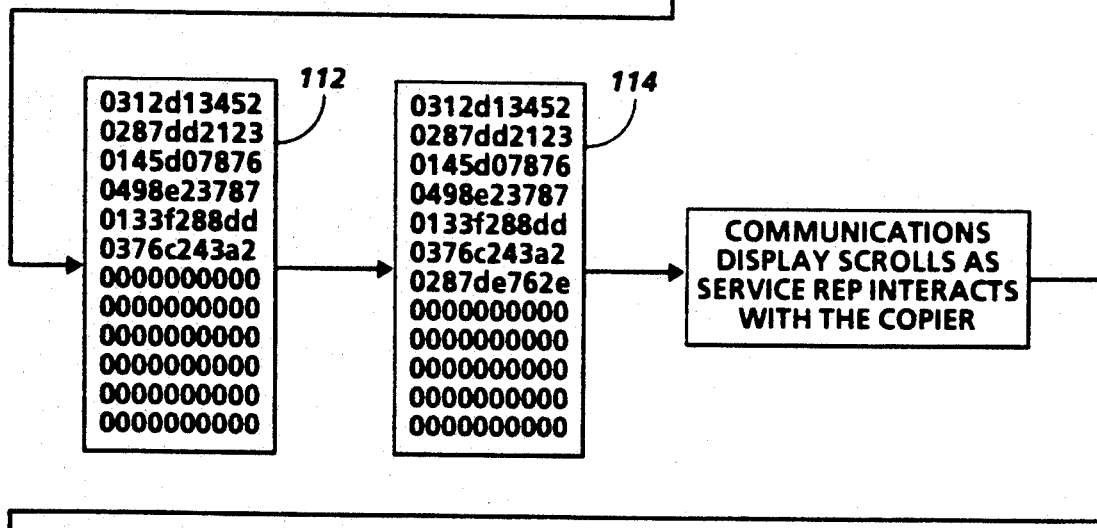
Figure 5:
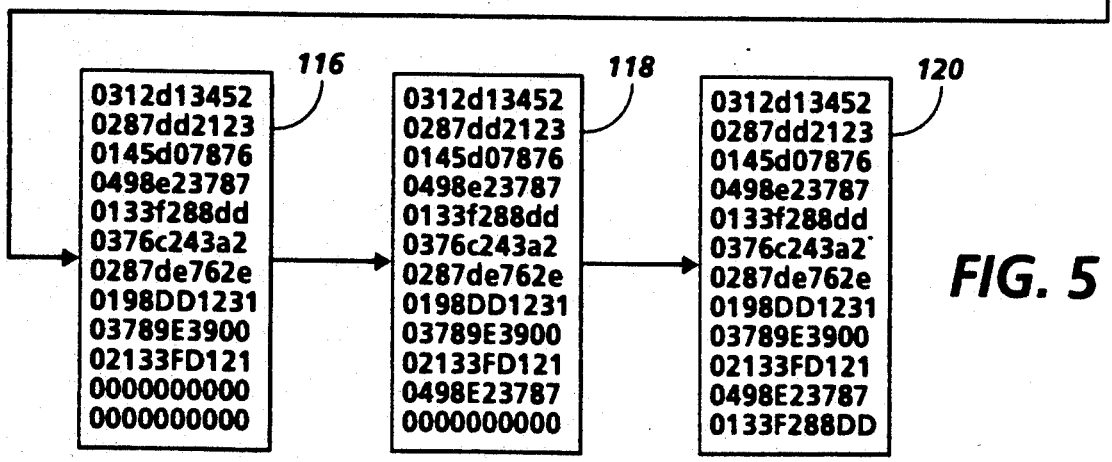

With reference to FIG. 5, there is illustrated the general flow or change of information within the network communications trace on the screen 51 as the service representative initiates machine activity. For example, assume that the service representative performs an action that normally causes communication among the printed circuit boards, such as pressing a button on the user interface or opening a door on the copier. Each new communication is displayed on the user interface as the various communications are scrolled through the display window as illustrated at windows 112, 114, 116, 118 and 120. Each row of alpha numeric characters represents one message between two printed circuit boards, as stated above, and coded in the communications display are the source and destination printed circuit boards for that particular message. It should be understood that various other data and information would vary depending upon the service representative initiated activity with the particular application. Thus, the service representative can easily and quickly in a visual manner determine which of the printed circuit boards is functioning correctly or incorrectly by examining the network communications trace.

Figure 6:
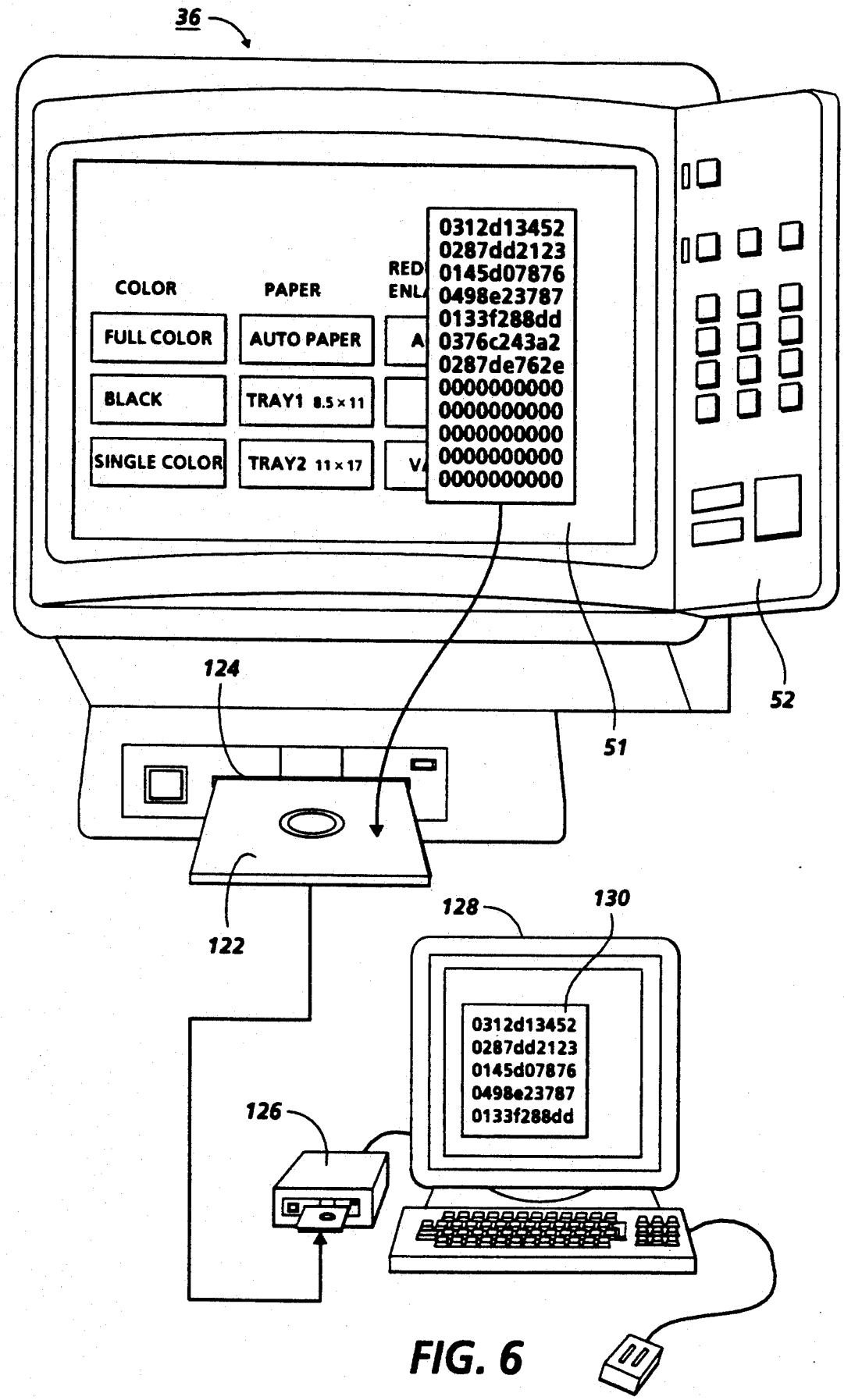

In accordance with another aspect of the present invention, reference is made to FIG. 6, illustrating a memory card 122 for insertion into slot 124 of the user interface 36. The service representative can control the communications display by merely entering coded information from the hard key buttons at 51. By appropriate commands from the keyboard 51, the display 51 can be instructed to filter out printed circuit board communications that are not of interest. For example, the service representative could enter a command for the display to ignore and not to include in the network communications trace communications between selected printed circuit boards or the service representative by suitable coded commands could instruct the printed circuit board 108 to display only communication between two given printed circuit boards. In this way extraneous and unnecessary communications could be deleted from the network trace for the service representative to much more easily focus on the communications between given two printed circuit boards.

It should be understood that there are also many options available to the service representative in accordance with the present invention such as cycling out or restarting and repeating selected communications. In addition, the system can be instructed to save the displayed network communications traces to a RAM buffer and to be dumped to a nonvolatile or permanent memory storage such as the memory card 122. Alternatively, the system can be instructed to save and store to memory selected network communication trace information and even related timing information as needed. This information can be saved and stored to memory without display or with display.

In addition, the information that is dumped to the memory card 122 and inserted in slot 126 of a suitable personal computer illustrated at 128 could be suitably displayed in a window as illustrated at 130 on the personal computer for analysis. It should also be understood that the network communications trace display need not have any effect on the operation of the user interface and base machine in general. The base machine or copier machine can be used in normal operation with the communication display serving merely as a window to the intercommunication between boards.

While the invention has been described with reference to the structure disclosed, it is not confined to the details set forth, but it is intended to cover such modifications or changes as may come within the scope of the following claims.

We claim:

1. A method of analyzing communication between control boards in an image processing apparatus having image processing components for forming an image, a controller for directing the operation of the image processing components, the controller including an interface display and a plurality of control boards, comprising the steps of:
   entering a communications network monitoring mode,
   automatically displaying a network communication trace in a window of the interface display, the network communication trace including network communications identifying the control board sending a command, the nature of the command, and the control board designated to receive the command,
   determining whether the control board designated to receive the command actually received the command, and
   confirming that a correct response to the command was taken.

2. The method of claim 1 wherein the network communication trace is a real time flow of communications between said plurality of control boards.

3. The method of claim 1 wherein the network communication trace includes rows of alpha numeric characters representing messages between predetermined control boards.

4. The method of claim 1 wherein the step of automatically displaying a network communication trace in a window of the interface display includes the step of filtering out selected network communications.

5. The method of claim 4 wherein the step of filtering out selected network communications includes the step of displaying network communications between selected control boards.

6. A method of analyzing communication between control boards in an image processing apparatus having image processing components for forming an image, a controller for directing the operation of the image processing components, the controller including an interface display and a plurality of control boards, comprising the steps of:
   entering a communications network monitoring mode,
   automatically displaying a real time network communication trace in a window of the interface display, the network communication trace including network communications identifying the control board sending a command, the nature of the command, and the control board designated to receive the command, the network communication trace including rows of alpha numeric characters representing messages between predetermined control boards,
   determining whether the control board designated to receive the command actually received the command, and
   confirming that a correct response to the command was taken.

7. The method of claim 6 wherein the step of automatically displaying a network communication trace in a window of the interface display includes the step of filtering out selected network communications.

8. The method of claim 7 wherein the step of filtering out selected network communications includes the step of displaying network communications between selected control boards.

9. A method of analyzing communication between control boards in an image processing apparatus having image processing components for forming an image, a controller for directing the operation of the image processing components, the controller including an interface display and a plurality of control boards, comprising the steps of:

- entering a communications network monitoring mode,
- automatically displaying a network communication trace on the interface display, the network communication trace including network communications between control boards, the network communications identifying the control board sending a command, the nature of the command, and the control board designated to receive the command, and
- selectively filtering out selected network communications.

10. The method of claim 9 wherein the step of filtering out selected network communications includes the step of displaying network communications between selected control boards.

11. The method of claim 9 wherein the network communication trace includes rows of alpha numeric characters representing messages between predetermined control boards.

12. The method of claim 9 including the steps of determining whether the control board designated to receive the command actually received the command, and confirming that a correct response to the command was taken.

13. The method of claim 9 including the steps of scrolling the network communication trace on the interface display.

14. The method of claim 9 wherein the step of automatically displaying a network communication trace includes the step of validating communication between selected control boards.

* * * * *